(12) United States Patent
Matsuzawa et al.

(10) Patent No.: US 9,509,901 B2
(45) Date of Patent: Nov. 29, 2016

(54) IMAGING APPARATUS HAVING AN ELECTRONIC ZOOM FUNCTION

(71) Applicant: Olympus Corporation, Hachioji-shi, Tokyo (JP)

(72) Inventors: Yoshinori Matsuzawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/886,502

(22) Filed: Oct. 19, 2015

(65) Prior Publication Data

US 2016/0044236 A1 Feb. 11, 2016

Related U.S. Application Data

(62) Division of application No. 13/828,716, filed on Mar. 14, 2013, now Pat. No. 9,204,053.

(30) Foreign Application Priority Data

Apr. 9, 2012 (JP) ................................ 2012-088634

(51) Int. Cl.
*H04N 5/262* (2006.01)
*H04N 5/228* (2006.01)
*H04N 5/232* (2006.01)

(52) U.S. Cl.
CPC ...... *H04N 5/23216* (2013.01); *H04N 5/23293* (2013.01); *H04N 5/23296* (2013.01)

(58) Field of Classification Search
CPC .. G02B 7/282; H04N 5/23296; H04N 5/232; H04N 5/23293; H04N 5/23212
USPC ............... 348/333.01–333.13, 240.1–240.99; 396/76, 85–88
See application file for complete search history.

(56) References Cited

U.S. PATENT DOCUMENTS

| | | | | |
|---|---|---|---|---|
| 5,305,038 A * | 4/1994 | Mogamiya | ............ | G02B 7/102 318/257 |
| 6,070,016 A * | 5/2000 | Kaneda | ................... | G02B 7/102 348/335 |
| 6,292,313 B1 * | 9/2001 | Kanayama | ............ | G02B 7/102 348/E5.042 |
| 6,522,838 B1 * | 2/2003 | Natsume | ................ | G02B 7/102 348/211.99 |
| 6,526,232 B1 * | 2/2003 | Mizumura | ............ | H04N 5/232 348/211.99 |
| 6,633,729 B1 * | 10/2003 | Yoshikawa | ............ | G03B 17/00 396/76 |
| 6,897,896 B1 * | 5/2005 | Mizumura | ............ | G02B 7/102 348/207.1 |
| 7,515,197 B2 | 4/2009 | Suzuki | | |
| 7,808,547 B2 * | 10/2010 | Hirai | ...................... | G02B 7/102 348/345 |

(Continued)

FOREIGN PATENT DOCUMENTS

JP 2007-722252 3/2007

*Primary Examiner* — Chia-Wei A Chen
(74) *Attorney, Agent, or Firm* — John C. Pokotylo; Straub & Pokotylo

(57) ABSTRACT

An imaging apparatus includes an imaging unit, a display unit, an interested-position obtaining unit, a zoom operation obtaining unit and an image-processing unit. The imaging unit is configured to image an image of an object through a lens. The display unit is configured to display the image imaged by the imaging unit. The interested-position obtaining unit is configured to obtain specification of an interested position in the image displayed on the display unit. The zoom operation obtaining unit is provided for the lens and is configured to obtain a zoom operation. The image-processing unit is configured to perform, on the image, an electronic zoom processing of enlarging the interested position, in accordance with the zoom operation.

9 Claims, 14 Drawing Sheets

(56) References Cited

U.S. PATENT DOCUMENTS

| | | | |
|---|---|---|---|
| 2002/0044206 A1* | 4/2002 | Kyuma | G02B 7/102 348/211.99 |
| 2002/0118964 A1* | 8/2002 | Enomoto | G03B 17/24 396/60 |
| 2004/0189848 A1* | 9/2004 | Idemura | H04N 5/23293 348/333.01 |
| 2004/0190887 A1* | 9/2004 | Natsume | G02B 7/08 396/86 |
| 2006/0023091 A1* | 2/2006 | Uchiyama | H04N 5/232 348/240.1 |
| 2006/0034594 A1* | 2/2006 | Yumiki | G02B 7/102 396/72 |
| 2007/0110305 A1 | 5/2007 | Corcoran et al. | |
| 2007/0140675 A1* | 6/2007 | Yanagi | G03B 17/04 396/88 |
| 2007/0296837 A1* | 12/2007 | Morita | H04N 3/155 348/240.99 |
| 2008/0008361 A1 | 1/2008 | Nozaki et al. | |
| 2008/0013799 A1 | 1/2008 | Steinberg et al. | |
| 2008/0018754 A1* | 1/2008 | Ejima | H04N 5/23245 348/240.3 |
| 2008/0212879 A1 | 9/2008 | Torii et al. | |
| 2009/0009531 A1 | 1/2009 | Sudo et al. | |
| 2009/0051789 A1 | 2/2009 | Ohsawa | |
| 2009/0073304 A1 | 3/2009 | Kumagai et al. | |
| 2009/0092386 A1* | 4/2009 | Kishimoto | H04N 5/23296 396/128 |
| 2009/0244324 A1 | 10/2009 | Saito et al. | |
| 2010/0054549 A1 | 3/2010 | Steinberg et al. | |
| 2010/0073546 A1 | 3/2010 | Mori | |
| 2010/0295970 A1* | 11/2010 | Suzuki | H04N 5/232 348/240.3 |
| 2010/0315521 A1 | 12/2010 | Kunishige et al. | |
| 2010/0321536 A1 | 12/2010 | Lee et al. | |
| 2011/0032372 A1 | 2/2011 | Uemura et al. | |
| 2011/0063118 A1 | 3/2011 | Sato et al. | |
| 2011/0122253 A1 | 5/2011 | Kino et al. | |
| 2011/0157397 A1 | 6/2011 | Yoshizumi | |
| 2011/0267374 A1 | 11/2011 | Sakata et al. | |
| 2011/0267503 A1 | 11/2011 | Kunishige et al. | |
| 2011/0304749 A1 | 12/2011 | Ishikawa | |
| 2012/0062692 A1* | 3/2012 | Tsubusaki | H04N 5/23296 348/36 |
| 2012/0133822 A1* | 5/2012 | Kawai | G02B 7/282 348/347 |
| 2012/0147222 A1 | 6/2012 | Erikawa | |
| 2012/0275648 A1 | 11/2012 | Guan | |
| 2013/0107018 A1 | 5/2013 | Sakurabu | |
| 2013/0120617 A1 | 5/2013 | Kim | |
| 2013/0258159 A1 | 10/2013 | Sakane | |
| 2014/0125856 A1 | 5/2014 | Kim et al. | |
| 2014/0184726 A1 | 7/2014 | Kim et al. | |
| 2014/0184854 A1 | 7/2014 | Musatenko | |
| 2015/0172537 A1 | 6/2015 | Ito | |

\* cited by examiner

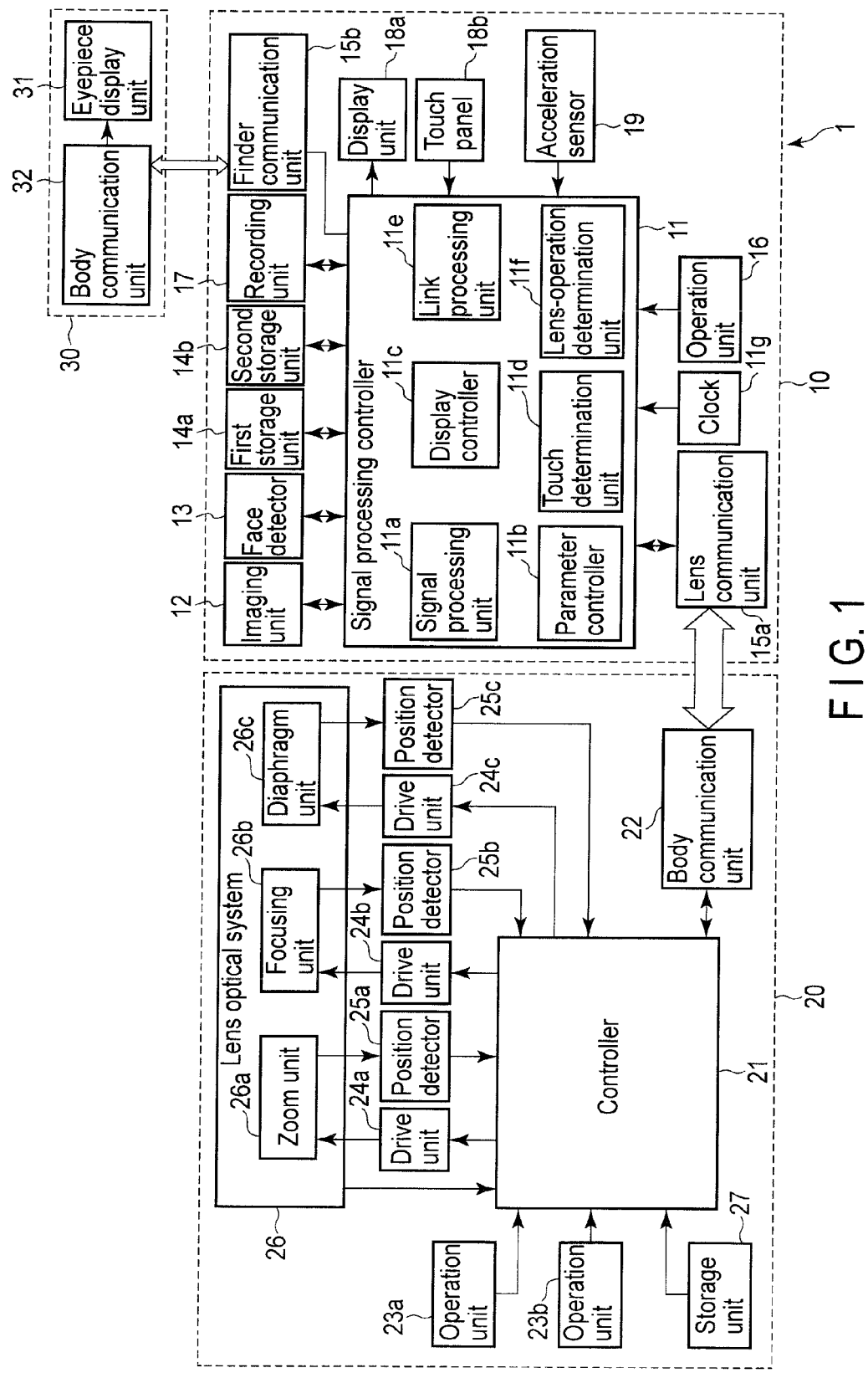
F I G. 1

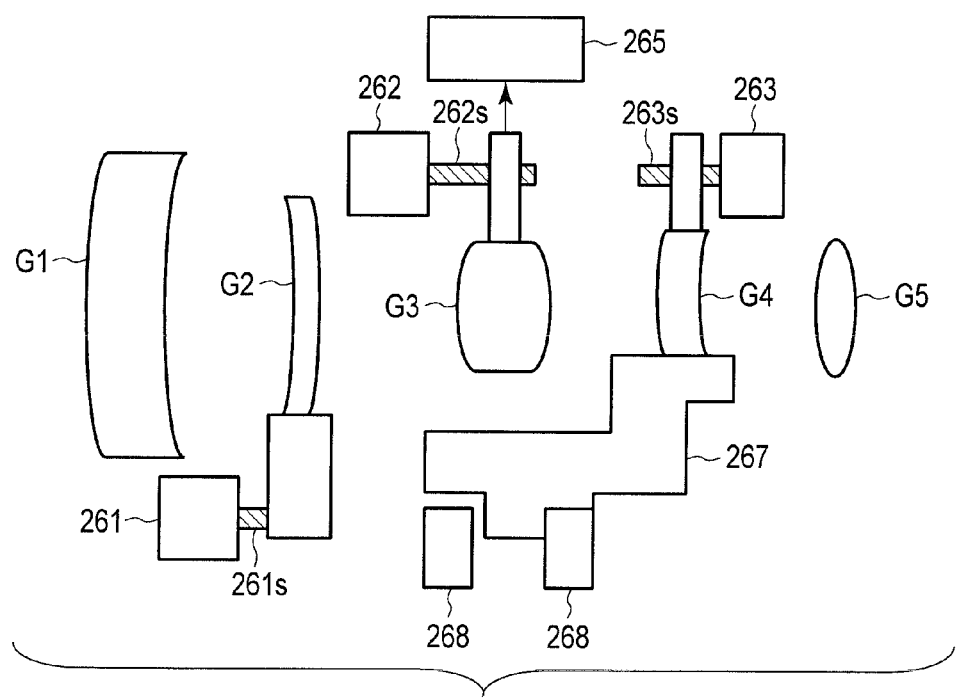
F I G. 17

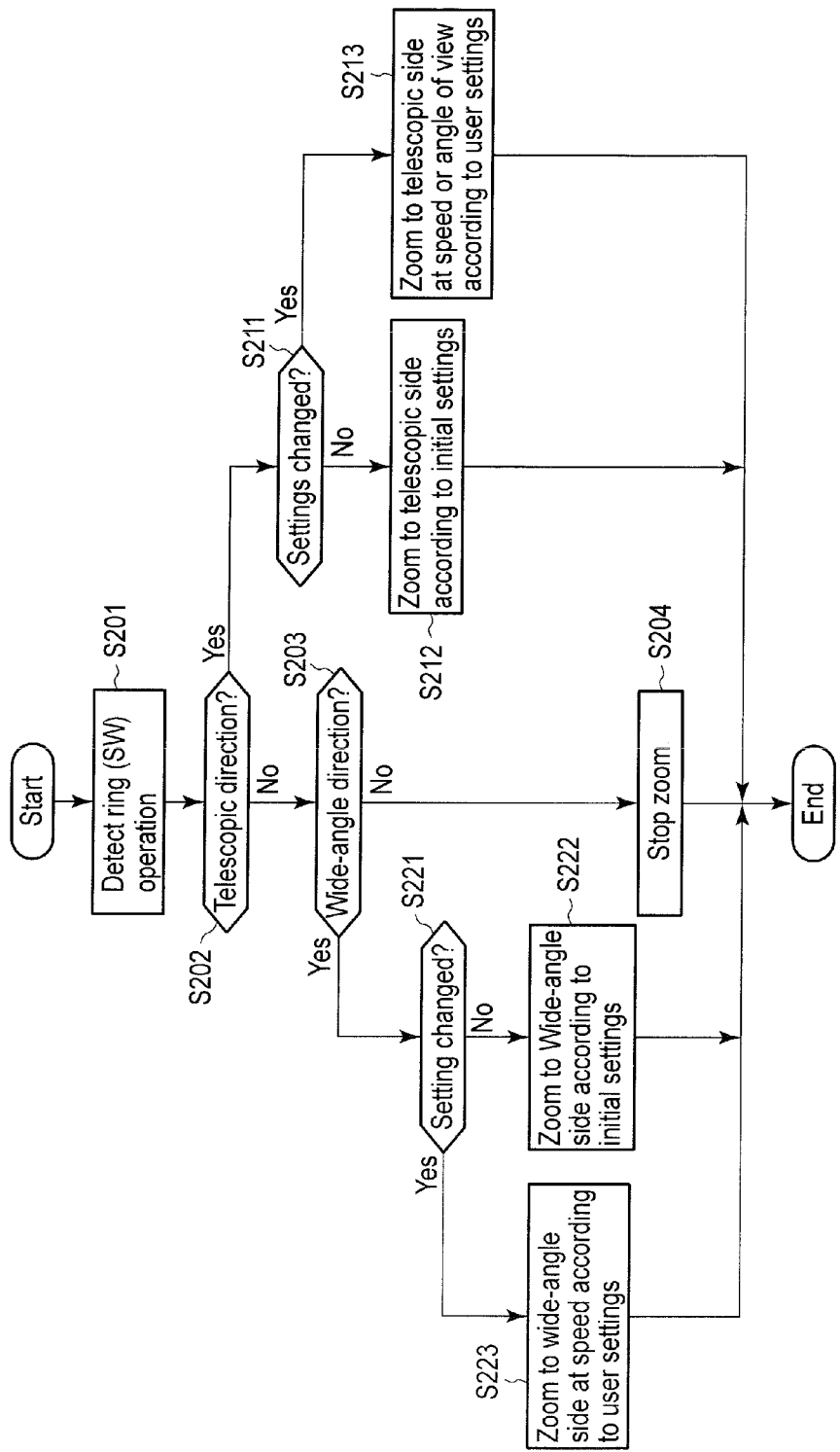
F I G. 21

IMAGING APPARATUS HAVING AN ELECTRONIC ZOOM FUNCTION

CROSS-REFERENCE TO RELATED APPLICATIONS

This application is a divisional application of U.S. patent application Ser. No. 13/828,716 (referred to as "the '716 application" and incorporated herein by reference), filed on Mar. 14, 2013, titled "IMAGING APPARATUS," and listing Yoshinori Matsuzawa and Osamu Nonaka as the inventors, the '716 being based upon and claiming the benefit of priority from prior Japanese Patent Application No. 2012-088634, filed Apr. 9, 2012, the entire contents of which are incorporated herein by reference.

BACKGROUND OF THE INVENTION

1. Field of the Invention

The present invention relates to imaging apparatus.

2. Description of the Related Art

In general, zoom functions are often used in imaging apparatuses. Zoom is classified into optical zoom in which a focal distance of a lens is optically changed and electronic zoom which electronically cuts out a part of an image. For example, Jpn. Pat. Appln. KOKAI Publication No. 2007-072252 discloses a technology relating to use of optical zoom and electronic zoom which are switched from each other as a zoom ring provided on a lens is operated.

BRIEF SUMMARY OF THE INVENTION

According to an aspect of the present invention, an imaging apparatus includes an imaging unit configured to image an image of an object through a lens; a display unit configured to display the image imaged by the imaging unit; an interested-position obtaining unit configured to obtain specification of an interested position in the image displayed on the display unit; a zoom operation obtaining unit provided for the lens and configured to obtain a zoom operation; and an image-processing unit configured to perform, on the image, an electronic zoom processing of enlarging the interested position, in accordance with the zoom operation.

According to an aspect of the present invention, an imaging apparatus includes an operation member configured to determine a cutout range change per time; and a specification unit configured to specify a center of a cutout area in an image.

According to an aspect of the present invention, a method of trimming an image includes specifying a cutout center in an image; and determining a cutout range change per time.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing an example configuration of a digital camera according to the first embodiment of the invention;

FIG. 3 is a view showing for explaining common zoom-in;

FIG. 17 is a schematic view showing an example of a lens optical system of a digital camera according to the third embodiment;

FIG. 21 is a flowchart which shows an example of processing in the digital camera according to the third embodiment.

DETAILED DESCRIPTION OF THE INVENTION

First Embodiment

Figure 2:
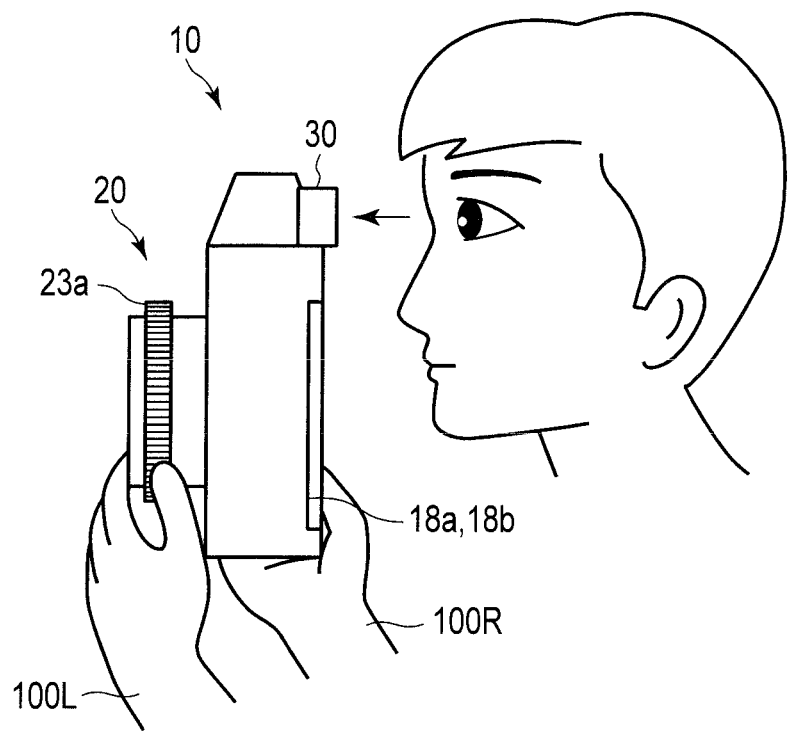
FIG. 2 schematically shows an example of a state in which the digital camera according to the first embodiment is held.

The first embodiment of the invention will be described with reference to the drawings. FIG. 1 shows a block diagram schematically showing a digital camera 1 as an imaging apparatus according to the present embodiment. The digital camera 1 is a camera of an interchangeable lens type, for example. However, technologies of the invention are not limited to the interchangeable lens type but are applicable to a compact camera with a fixed lens. With the camera of interchangeable lens type, shooting can be achieved with use of various lenses in compliance with an object to be captured. Accordingly, cameras of this type are often used by users who want to image objects which are available in daily life in addition to ordinary objects, such as people and sceneries. Users who are assumed to utilize the invention include users of such cameras with interchangeable lenses.

The digital camera 1 of the interchangeable lens type comprises a camera body 10, a lens 20, and a finder unit 30. A user takes pictures with a favorite lens 20 attached to the camera body 10. The lens 20 leads an object image to an imaging unit 12 provided in the camera body 10 described later. Here, the lens 20 will be described as a zoom lens. The lens 20 comprises a lens optical system 26. A zoom unit 26a, a focus unit 26b, and a diaphragm unit 26c are provided in the lens optical system 26. The zoom unit 26a moves positions of a plurality of lens elements, to perform a zoom function. The focus unit 26b moves a focus lens and adjusts an object image to comply with the imaging unit 12. The diaphragm unit 26c adjusts an amount of light guided to the imaging unit 12 by opening/closing a diaphragm.

The lens 20 comprises a controller 21 which controls operation of the zoom unit 26a, focus unit 26b, and diaphragm unit 26c. Also, the lens 20 comprises a position detector 25a which detects the position of each element in the zoom unit 26a, a position detector 25b which detects the position of each element in the focus unit 26b, and a position detector 25c which detects the position of each element in the diaphragm unit 26c. Still also, the lens 20 comprises a drive unit 24a which drives a motor inside the zoom unit 26a, a drive unit 24b which drives a motor inside the focus unit 26b, and a drive unit 24c which drives a motor inside the diaphragm unit 26c. The lens 20 also comprises a storage unit 27 which records control data and programs, and a body communication unit 22 to communicate with a camera body 10.

Based on control data and programs recorded on the storage unit 27 and various control parameters obtained through the body communication unit 22, the controller 21 operates the drive unit 24a to drive the zoom unit 26a by use of output of the position detector 25a. Also based on control data and programs recorded on the storage unit 27 and various control parameters obtained through the body communication unit 22, the controller 21 operates the drive unit 24b to drive the focus unit 26b by use of output of the position detector 25b. Still also based on control data and programs recorded on the storage unit 27 and various control parameters obtained through the body communication unit 22, the controller 21 operates the drive unit 24c to drive the diaphragm unit 26c by use of output of the position detector 25c.

The lens 20 comprises operation units 23a and 23b. The operation units 23a and 23b are operation obtaining units configured to be inputted operation of the zoom unit 26a, focus unit 26b, and diaphragm unit 26c. A user can control operation of the zoom unit 26a, focus unit 26b, and diaphragm unit 26c by operating the operation units 23a and 23b. The user can perform lens operation for imaging specialized in blur effects, by operating these operation units 23a and 23b. For example, the operation units 23a and 23b comprise a ring part which is pivoted along a cylindrical lens body. The ring part allows shift operation as will be described later. For example, rotation operation thereof corresponds to input of the operation unit 23a, and the shift operation corresponds to input to the operation unit 23b. The operation units 23a and 23b may be operation switches may be used in place of.

For example, the operation unit 23a which is a zoom ring is not mechanically linked to the zoom unit 26a by a gear or a cam. With the lens 20 of the present embodiment, the zoom unit 26a is driven by the mechanism of the drive unit 24a using a small actuator or a mechatronics technology, in accordance with operation of the operation unit 23a.

On the other side, the camera body 10 comprises a signal processing controller 11 which processes various signals and controls respective components of the camera body 10. The signal processing controller 11 is configured by, for example, an integrated circuit. The signal processing controller 11 is provided with a signal-processing unit 11a which can perform image processing required for displaying or recording an image. A parameter-control unit 11b which controls various parameters is provided in the signal processing controller 11. Further, the display control unit 11c which controls image display onto a display unit 18a and an eyepiece display unit 30, and a touch determination unit 11d which processes an input from the touch panel 18b described later. The signal processing controller 11 is provided with a link processing unit lie which performs recording control of two images in multi-recording of recording two images simultaneously. A lens-operation determination unit 11f which determines operation of the operation units 23a and 23b is provided in the signal processing controller 11.

The camera body 10 comprises the imaging unit 12. The imaging unit 12 performs imaging operation. That is, the imaging unit 12 converts into an electrical signal an object image which enters from the lens 20, and generates an image signal. The imaging unit 12 outputs the generated image signal to the signal processing controller 11.

The camera body 10 comprises the display unit 18a for displaying an image. The display unit 18a comprises a liquid-crystal display panel, for example. The camera body 10 is configured to be attached with a finder unit 30. That is, the finder unit 30 comprises an eyepiece display unit 31 and a body communication unit 32 while the camera body 10 comprises the finder communication unit 15b. The body communication unit 32 of the finder unit 30 and the finder communication unit 15b are connected and communicate with each other. The eyepiece display unit 31 has a small liquid crystal panel or an organic EL panel. The finder unit 30 is to enlarge a display image by a dedicated optical system, and makes the display image viewable for a user. Since the user can look into a finder for observation, the image can be observed without being influenced by external light. Further, the finder unit 30 is configured in a manner that visibility can be adjusted to comply with user's visibility requirement by adjusting the dedicated optical system. Owing to the visibility adjustment, the user can observe an excellent image irrespective of the user's eyesight. The display unit 18a and the eyepiece display unit 31 operate under control of the display control unit 11c in the signal processing controller 11.

The camera body 10 is provided with an operation unit 16 which receives input dependent on various operations of the user. Operation at the time of imaging is most prioritized for an imaging apparatus. For example, a release button for taking still images is located at a position where the release button can be operated with the right forefinger. The user can make the digital camera 1 perform imaging operation by operating this release button. In addition, the operation unit 16 is provided with switches and dials, through which changes are inputted about imaging parameters such as a shutter speed, a diaphragm, an exposure correction, sensitivity settings, and a focus position. A cross key used to input an interested object, according to the present embodiment, is provided on the operation unit 16.

The camera body 10 comprises the touch panel 18b. This touch panel 18b is provided, for example, over the display unit 18a. The touch panel 18b also receives input of instructions from the user. The user can operate the digital camera 1 by touching positions corresponding to icons displayed, for example, on the display unit 18a. The touch panel 18b receives instructions relating to zoom operation according to the present embodiment from a user. For example, the touch panel 18b is used to input an interested object. A signal which the touch panel 18b outputs upon touch by the user is outputted to the touch determination unit 11d in the signal processing controller 11. The signal is processed at first by the touch determination unit 11d.

The camera body 10 comprises a first storage unit 14a and a second storage unit 14b. The first storage unit 14a is, for example, a ROM and stores programs which are used for control by the signal processing controller 11. The second storage unit 14b is, for example, a RAM such as a SDRAM, and temporarily stores a processing result of the signal processing controller 11. Further, the camera body 10 is provided with a recording unit 17 for recording image data generated by imaging. The recording unit 17 as a common recording medium is detachably connected to the camera body. The camera body 10 comprises a face detector 13 which detects a face part of an object, based on an image signal obtained by the imaging unit 12. The camera body 10 comprises an acceleration sensor 19 for detecting a posture of the camera body 10. The camera body 10 comprises a lens communication unit 15a for communicating with the body communication unit 22 of the lens 20. Instructions for operation of the lens 20 from the camera body 10 to the lens 20, and transfer of information concerning a state of the lens 20 from the lens 20 to the camera body 10 are performed by the lens communication unit 15a and the body communication unit 22. The camera body 10 comprises a clock 11g for adding data of imaged date/time to an image taken.

The signal processing controller 11 operates according to a program stored in the first storage unit 14a. A signal processing unit 11a in the signal processing controller 11 creates a preview image, based on the image signal inputted from the imaging unit 12 in a manner that a user can perform imaging while visually checking the display unit 18a and the eyepiece display unit 30. The display control unit 11c in the signal processing controller 11 causes the display unit 18a or the eyepiece display unit 30 to display the preview image as a through image. In accordance with input from the operation unit 16, the signal processing unit 11a in the signal processing controller 11 creates a recording image, based on an image signal inputted from the imaging unit 12 at the time of imaging, and makes the record unit 17 record this recording image. The parameter-control unit 11b in the signal processing controller 11 controls imaging, for example, by evaluating focusing, based on contrast of a face part detected by a face detector 13, detecting an offset of a focus based on a phase difference signal, and switching an adjustment amount, such as an exposure amount. The touch determination unit 11d in the signal processing controller 11 obtains a signal from the touch panel 18b, and obtains instructions of the user through the touch panel 18b. The link processing unit 11e in the signal processing controller 11 creates a whole image as a first image, and an image as a second image obtained by cutting out a part of the whole image. The link processing unit 11e makes the whole image and the cutout image be recorded and makes the display unit 18a display a required image. The lens-operation determination unit 11f determines operation of the operation unit 23a and the operation unit 23b of the lens 20, and obtains instructions of the user.

Operation of the digital camera 1 according to the present embodiment will now be described. The digital camera 1 according to the present embodiment can zoom in centering on the position which is specified in advance by the user through operation using the operation unit 23a of the lens 20. The digital camera 1 according to the present embodiment is gripped by a user, for example, as shown in FIG. 2. That is, the user grasps the lens 20 in the left hand 100L, and operates the touch panel 18b and the operation unit 16 by the right hand 100R. In the present embodiment, the operation unit 23a of the lens 20 is a zoom ring which is pivoted along the cylindrical lens body. The user observes display of the display unit 18a and the finder unit 30.

Figure 3:
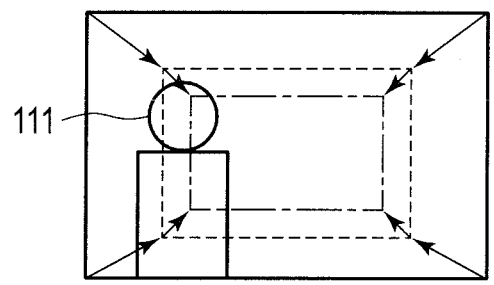
Figure 4:
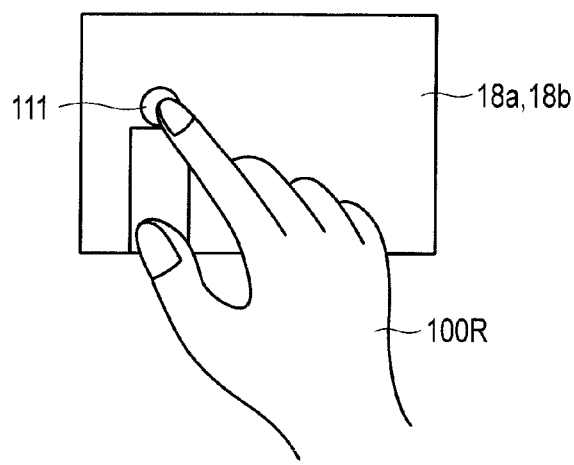
FIG. 4 is a view for explaining an example of a method for specifying an interested position in the digital camera according to the first embodiment.
Figure 5:
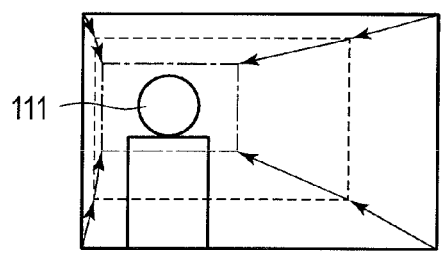
FIG. 5 is a view for explaining an example of zoom-in operation of the digital camera according to the first embodiment.

In general, when zoom operation is performed in optical zoom, the display gradually zooms in toward the center of an image. Accordingly, as shown in FIG. 3, when zoom operation is performed, for example, in a state that an interested object 111 such as a person is out from the center with the digital camera 1 fixed, as indicated by a broken line and one-dot chain line in FIG. 3, the angle of view gradually changes as indicated by a broken line and a one-dot chain line, and the interested object 111 comes out of the angle of view.

On the other side, in operation of the digital camera 1 according to the present embodiment, for example, the touch panel 18b is touched by the right hand 100R. The face of the person as the interested object 111 displayed on the display unit 18a is specified as an interested position. Thereafter, as the operation unit 23a of the lens 20 is operated, the angle of view changes to the broken line and then to the one-dot chain line in this order, thereby zooming in to enlarge the interested object 111. Here, after the user specifies the interested position, imaging operation including operation of the operation unit 23a may be performed seeing the display unit 18a or seeing the eyepiece display unit 31 of the finder unit 30.

By setting an imaging mode in advance, whether zooming in to the interested object 111 is performed by electronic zoom as in the present embodiment or by driving the zoom unit 26a to optically zoom may be switched by operating the operation unit 23a. The configuration may be arranged so as to use the electronic zoom when an interested position is specified or to use optical zoom otherwise.

A user who is confident of skills to make full use of optical zoom which enlarges with reference to a image center may carry out optical zoom operation by operating the operation unit 23a for zoom as in the prior art during panning. The user who is not confident of zoom operation may carry out operation to specify a face center and a zoom center by touching the touch panel 18b, to use the zoom function of zooming in about the specified position by the digital camera 1 without panning. That is, operation of even the same operation unit 12a switches so as to perform optical zoom solely or together with electronic zoom, depending on whether zoom-center specification operation has been made or not. Electronic zoom control need not always require optical zoom but may be performed only by trimming of cutting out the image. The speed of zoom is controlled by the operation unit 23a for zoom. Once zooming is started only by touch operation, the user cannot zoom at a favorite speed and cannot stop zooming when the user wants to stop. When an interested position is approximately the center of the image, electronic zoom need not be used but electronic zoom and optical zoom may be switched depending on the interested position.

Figure 6:
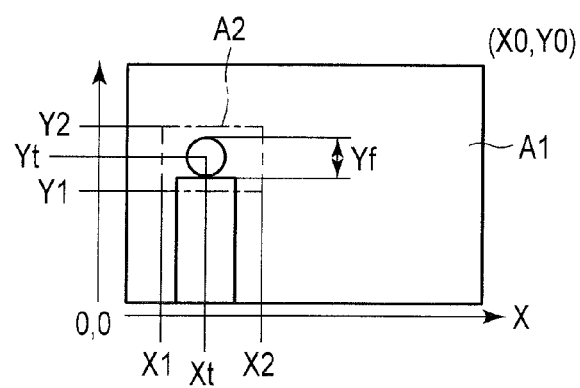
FIG. 6 is a view for explaining an example of coordinates and a zoomed area in an image of the digital camera according to the first embodiment.

Operation according to the present embodiment will be described in more details. As shown in FIG. 6, an area of an image before zoom-in is referred to as a non-zoomed area A1. As shown in FIG. 6, in the non-zoomed area A1, an x-axis is defined in a horizontal direction of an image, and y-axis is defined in an vertical direction of the image. An origin (0, 0) is defined at the lower left corner of the non-zoomed area A1, the value of the x-coordinate increases in the rightward direction. The value of the y-coordinate increases in the up direction. The coordinate of the upper right corner of the image is defined at (X0, Y0).

The touch determination unit 11d detects a touch on the touch panel 18b by the user. A detection result thereof is outputted to the face detector 13. The face detector 13 detects a face near a touched position detected by the touch panel 18b. The coordinates of the center of this face are set as (x, y)=(Xt, Yt), and the length of the face in the y-axis direction is referred to as Yf. The parameter-control unit 11b obtains these values Xt, Yt, and Yf. Using these values, the parameter-control unit 11b calculates values Y1 and Y2 of y-coordinates from the following equations (1) and (2), respectively, as well as calculates values X1 and X2 of x-coordinates by the following equations (3) and (4), respectively.

$$Y1=Yt-Yf \quad (1)$$

$$Y2=Yt+Yf \quad (2)$$

$$X1=Xt-1.5\times Yf \quad (3)$$

$$X2=Xt+1.5\times Yf \quad (4)$$

The parameter-control unit 11b outputs a calculation result to the signal-processing unit 11a. An area indicated by a one-dot chain line and including x-coordinates from X1 to X2 and y-coordinates from Y1 to Y2 is referred to as a zoomed area A2. In the present embodiment, zoom-in is performed from the non-zoomed area A1 to the zoomed area A2 by use of electronic zoom, in accordance with operation of the operation unit 23a of the lens 20 by the user.

The lens operation determination unit 11f determines operation of the operation unit 23a by the user. The lens operation determination unit 11f outputs information relating to input from the operation unit 23a at the signal-processing unit 11a. The signal-processing unit 11a calculates a y-coordinate Yd of the lower edge of the image during zoom, a y-coordinate Yu of the upper edge thereof, an x-coordinate Xl of the left edge thereof, and an x-coordinate Xr of the right edge thereof by the following equations (5) through (8), by using a predetermined constant h0 and a variable h.

$$Yd=Y1\times h/h0 \quad (5)$$

$$Yu=Y0-(Y0-Yt+Yf)\times h/h0 \quad (6)$$

$$Xl=X1\times h/h0 \quad (7)$$

$$Xr=Xl+(Yu-Yd)\times \alpha. \quad (8)$$

Figure 7A:
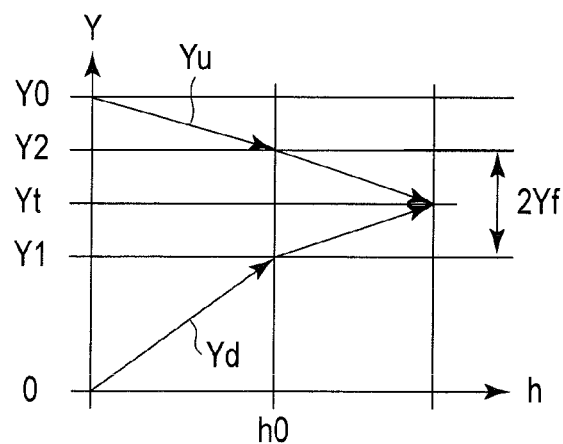
FIG. 7A is a view for explaining an example of Y-coordinates of an image area during zoom operation of the digital camera according to the first embodiment.
Figure 7B:
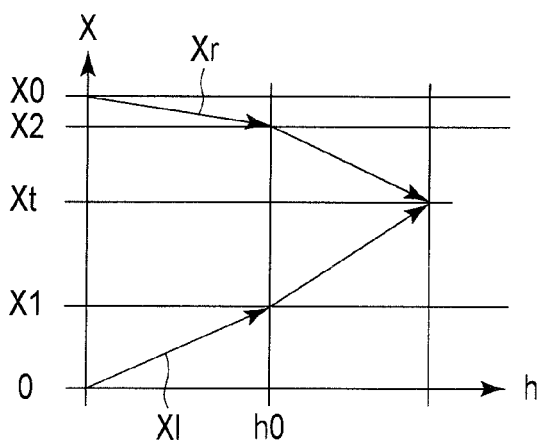
FIG. 7B is a view for explaining an example of X-coordinates of an image area during zoom operation of the digital camera according to the first embodiment.

Here, α is a value relating to an aspect ratio. h and h0 are values relating to a zoom ratio and can indicate rotation amounts of the operation unit 23a as a lens ring. For example, in case of a setting that zoom-in to the zoomed area A2 is performed as the operation unit 23a, h0 is a displacement amount corresponding to one turn of the operation unit 23a, and h is a displacement amount of the operation unit 23a at the time of the operation unit 23a detected by the lens operation determination unit 11f. Also, h and h0 can indicate, for example, zoom-in time. For example, in case of setting that zoom-in to the zoomed area A2 is performed when zoom-in operation continues for 5 seconds, h0 takes 5 seconds and h is elapsed time at the time. According to the foregoing equations (5) through (8), a y-coordinate Yd of the lower edge and a y-coordinate Yu of the upper edge are as shown in FIG. 7A, and an x-coordinate Xl of the left edge, and an x-coordinate Xr of the right edge in FIG. 7B. When the variable h becomes greater than h0, zoom-in is performed more than the zoomed area A2 toward the center of the detected face. The foregoing x-coordinate and y-coordinates may be configured to be changed depending on the posture of the camera body 10 detected by an acceleration sensor 19.

According to the present embodiment, the digital camera 1 performs zoom-in operation by electronic zoom in a manner that an interested object specified by the touch panel 18b is positioned at the center, when the user operates the operation unit 23a such as a zoom ring without changing the direction of the digital camera 1, i.e., without panning. According to the embodiment, panning of the camera is not required, and therefore, a motion picture which smoothly zooms in can be imaged, for example, in video imaging. Further, smooth zoom-in can be achieved toward an interested object, for example, when the digital camera 1 is fixed to a tripod, without changing the direction of the digital camera 1.

The operation unit 23a is configured in a manner that, for example, a predetermined relationship is maintained between a rotation angle of the ring unit of the zoom lens as the operation unit 23a and a focal length of the lens. Capability of changing the predetermined correspondence relationship will be described again in the third embodiment.

In this case, the user rotates the ring unit of the zoom lens by an angle corresponding to a focal length thereof. Further, the operation unit 23a may be configured in a manner that a predetermined relationship is maintained between the rotation angle of the ring unit of the zoom lens and a change of the focal length of the lens. In this case, the user maintains the ring unit of the zoom lens rotated until a desired focal length is reached. The operation unit 23a may comprise a wide-angle button to zoom out to a wide-angle side and a tele-button to zoom in to a telescopic side.

Also in the present embodiment, the zoomed area A2 is determined based on the position of a face detected by the face detector 13. However, the zoomed area A2 need not be based on the position of the face. For example, the zoomed area A2 may be a predetermined area having a touched position as a centroid or may be an area which is set as the user selects a desired area by surrounding a desired area with use of the touch panel 18b.

Therefore, the user can favorably set the zoom speed and a stop position, depending on a manner of operating the zoom operation unit (the ring unit of the zoom lens and switches for telescopic and wide-angle sides). From this point of view, there is provided a camera (imaging apparatus) which determines zoom change per time and a zoom stop position in accordance with operation of the zoom operation member and which can change a zoom center in the image. When a specified point is approximately the center of the image, electronic zoom need not be performed. Electronic zoom and optical zoom may be switched in correspondence with location of the specified point. Naturally, since there is a limit to optical zoom, electronic zoom may be performed so as to compensate for the limit.

Thus, the imaging unit 12 functions, for example, as an imaging unit configured to image an image of an object through the lens. For example, the display unit 18a functions, for example, as a display unit configured to display an image imaged by the imaging unit. The touch panel 18b functions, for example, as an interested position obtaining unit configured to obtain specification of an interested position in an image displayed on the display unit. The operation unit 23a functions, for example, as a zoom operation obtaining unit provided on the lens and configured to obtain zoom operation. The signal processing controller 11 functions, for example, as an image processing unit configured to perform, on an image, electronic zoom processing to enlarge an interested position in accordance with the zoom operation.

Modification of First Embodiment

A modification of the first embodiment will now be described. Difference from the first embodiment will be described first. The same portions as those of the first embodiment will be denoted at the same reference signs, respectively, and descriptions thereof will be omitted. In the first embodiment, the user carries out operation of touching the touch panel 18b, seeing the display unit 18a, when an interested object is set. In contrast, in the present modification, the user sets an interested object while looking into the finder unit 30.

Figure 8:
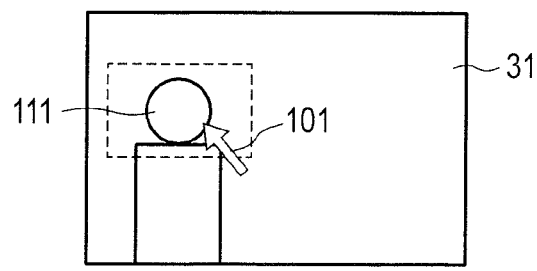
FIG. 8 is a view for explaining an example of a method for specifying an interested position in a digital camera according to a modification of the first embodiment.

Therefore, the eyepiece display unit 18a shows a cursor 101, for example, as shown in FIG. 8. The cursor 101 moves as the user operates a button for selecting, for example, up, down, left, and right sides of the operation unit 16. The user moves the cursor 101 to a position of an interested object by using the operation unit 16 and presses an enter button. The interested object can thereby be selected. Further, the touch panel 18b may be used to move the cursor 101. In this case, the user can operate, for example, the touch panel 18b by the thumb of the right hand. The other features of operation are the same as those in the first embodiment.

According to the present modification, the same operation can be performed to obtain the same effect as the first embodiment while visually checking an image by the eyepiece display unit 31. From this point of view, the invention provides a camera (imaging apparatus) which can determine change of zoom per time and a stop position and which can change the center of zoom in the image. When a specified point is the approximate center of the image, electronic zoom need not be performed but electronic zoom and optical zoom can be switched in accordance with location of the specified point.

Second Embodiment

Figure 9A:
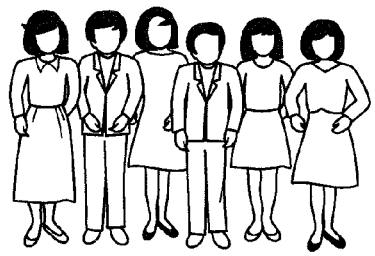
FIG. 9A is a view for explaining an example of a scene where a digital camera according to the second embodiment is used.
Figure 9B:
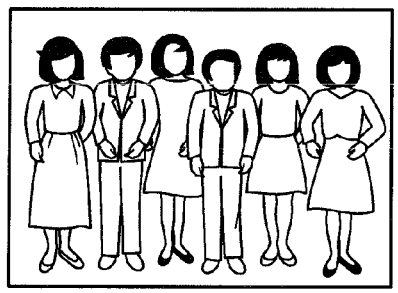
FIG. 9B is a view for explaining an example of multi-recording according to the second embodiment, showing an example of a whole image.
Figure 9C:
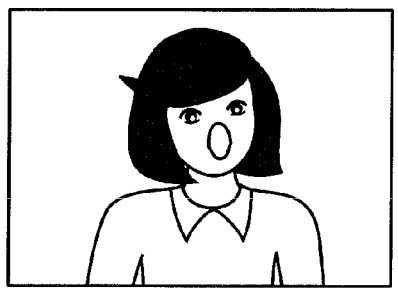
FIG. 9C is a view for explaining an example of multi-recording according to the second embodiment, showing an example of a cutout image.

The second embodiment of the invention will now be described. Difference from the first embodiment will be described below. The same portions as those of the first embodiment will be denoted at the same reference signs, and detailed descriptions thereof will be omitted. In the present embodiment, the first embodiment is applied to so-called multi-recording by which, for example, a video of a whole angle of view and an enlarged video thereof are recorded simultaneously in a motion picture. The present embodiment will be described with reference to an example of showing a state of choral singing in which a lot of people as shown in, for example, FIG. 9A are an interested object. In the present embodiment, a whole image which reflects the whole scenery is recorded as shown in FIG. 9B, and simultaneously, a cutout image which is enlarged and cut out as shown in FIG. 9C is recorded. A cutout image as shown in FIG. 9C is obtained by electronic zoom from the whole image as shown in FIG. 9B. Such a processing peculiar to multi-recording is mainly performed by a link processing unit 11e. In the present embodiment, the first embodiment is applied to zoom-in of a cutout image.

Figure 10:
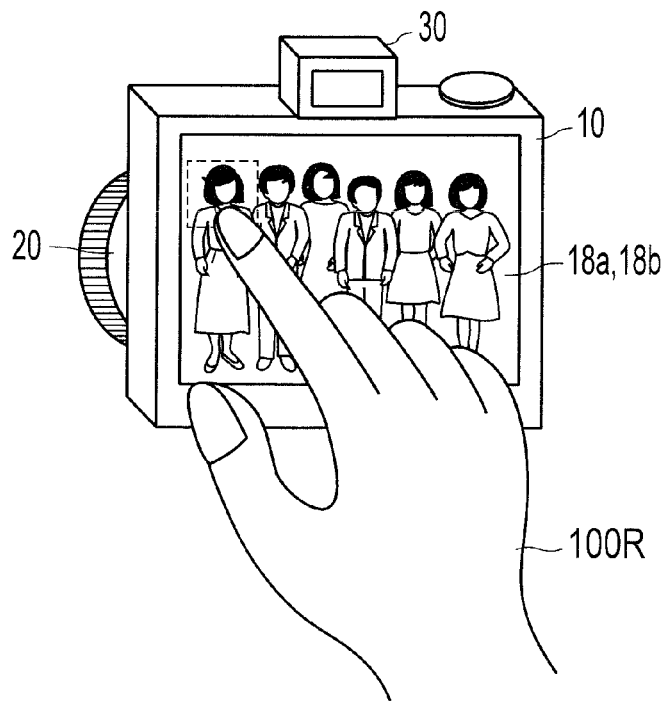
FIG. 10 is a view for explaining an example of a method for specifying a fixation point of the digital camera according to the second embodiment.

Operation of the digital camera 1 according to the present embodiment will now be described. Execution of multi-recording imaging is now supposed to have been selected. At this time, the link processing unit 11e of the digital camera 1 continues obtaining an image (main image) as the whole image, as shown in FIG. 9B. On the other hand, the link processing unit 11e continues obtaining a cutout image (sub image). To obtain the cutout image, a user specifies an interested object by, for example, touching the touch panel 18b as in the first embodiment, as shown in FIG. 10.

A touch determination unit 11d detects a touched position. A face detector 13 determines an interested position which includes an interested object, based on this touched position, as in the first embodiment. The parameter control unit 11b determines a zoomed area A2 based on the position of the interested object. The display control unit 11c displays the zoomed area A2, for example, on a display unit 18a, as shown in FIG. 11A.

Figure 11A:
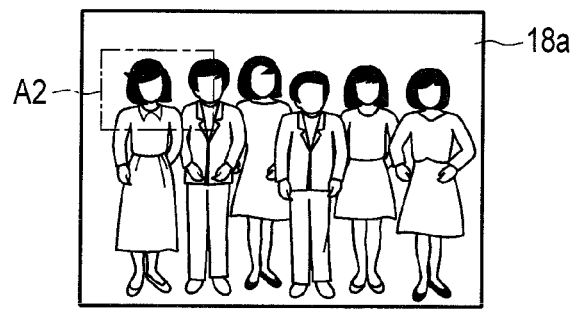
FIG. 11A, FIG. 11B, FIG. 11C, and FIG. 11D each show an example of an image area during zoom operation of the digital camera according to the second embodiment.
Figure 11B:
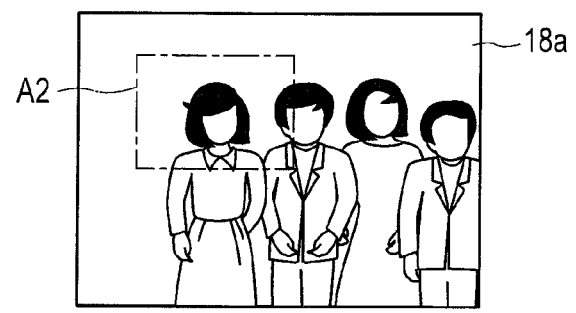
Figure 11C:
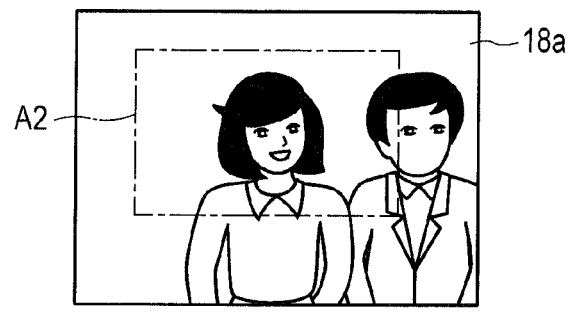
Figure 11D:
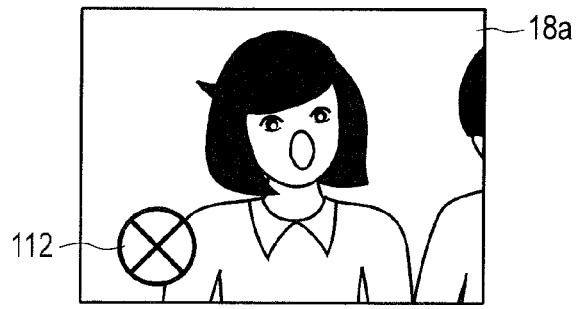

When a user operates the operation unit 23a of the lens 20 so as to zoom in while a cutout image is obtained by the link processing unit 11e, the signal-processing unit 11a creates an image which gradually zooms in to the zoomed area A2 by electronic zoom, as shown in FIG. 11B, FIG. 11C, and FIG. 11D, as in the first embodiment, and displays the image as a cutout image on the display unit 18a. The process of this zoom-in is also obtained as a cutout image, and continuously recorded on the recording unit 17. When the zoomed area A2 is reached, the signal-processing unit 11a then stops zoom-in. As shown in FIG. 11D, a specification release key 112 is then indicated.

When a part of the specification release icon 112 is touched by the user, the electronic zoom of a cutout image is released as shown in FIG. 11A. If the part of the specification release icon 112 is touched, zoom-out may be performed gradually in order of FIG. 11C, FIG. 11B, and FIG. 11A. Otherwise, zoom-out may be performed gradually in order of FIG. 11C, FIG. 11B, and FIG. 11A by operation of the operation unit 23a.

Figure 12A:
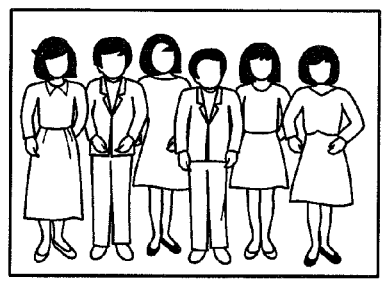
FIG. 12A, FIG. 12B, FIG. 12C, FIG. 12D, and FIG. 12E each show an example of an image area during zoom operation where the second embodiment is not applied.
Figure 12B:
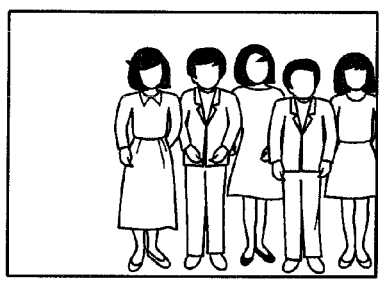
Figure 12C:
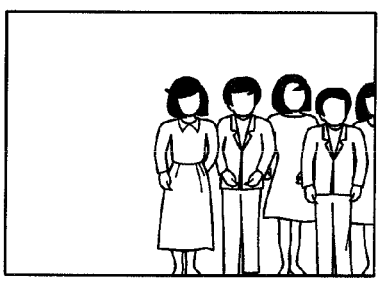
Figure 12D:
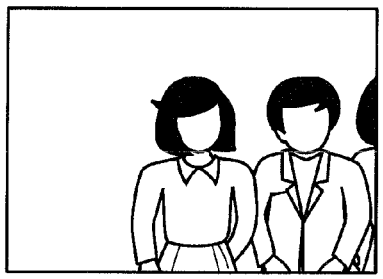
Figure 12E:
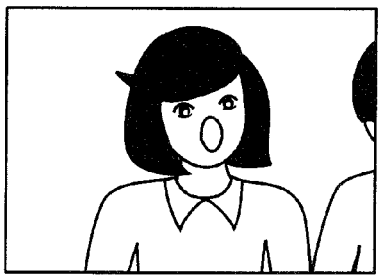

A cutout image is as follows, when an interested object positions at a peripheral part of a whole image as shown in, for example, FIG. 12A where zoom-in is performed toward the center of an image, without applying the present embodiment. That is, after panning or while panning as shown in FIG. 12B and FIG. 12C, zoom-in is performed as shown in FIG. 12C, FIG. 12D, and FIG. 12E. Since the digital camera 1 is being panned at this time, the whole image which is simultaneously obtained comes out of center as shown in, for example, FIG. 12C.

In contrast, since the digital camera 1 is not panned according to the present embodiment, a motion picture is obtained in which the whole image properly continues capturing the whole view, as shown in FIG. 11A, while the cutout image zooms in with the interested object positioned in the center. Operation using a touch panel hardly generates sound noise in comparison with operation using switches. Accordingly, in motion picture imaging as in the present embodiment, specification of a cutout area is effective also in view of noise prevention.

For a cutout image, what part of a whole image has been cut out can be recognized more easily and is easier to view when an image which gradually zooms in toward a zoomed area A2 is obtained as in the present embodiment, than when an image of a zoomed area A2 is suddenly cut out. Thus, the present embodiment is effective in obtaining a video which is easy to view.

The present embodiment may be configured to allow a user to specify the zoomed area A2 with the cursor 101 while looking into an eyepiece display unit 31, as in the modification of the first embodiment. For example, a whole image and a cutout image may be displayed, for example, arrayed in line on the display unit 18a.

Thus, the invention can provide a camera (imaging apparatus) which determines change of cutout per time and a cutout range in accordance with operation of a cutout operation member for a sub image and which can change the center of cutout in the image. Cutout control is a technology of changing a range of the imaging element to be displayed or recorded, and is thus the same technology as electronic zoom control. When a specified point is approximately the center of the image, electronic zoom need not be used but electronic zoom and optical zoom may be switched depending on the location of the specified point.

First Modification of Second Embodiment

The first modification of the second embodiment will now be described. Difference from the first embodiment will be described below. The same portions as those of the first embodiment will be denoted at the same reference signs, and detailed descriptions thereof will be omitted. In the second embodiment, only electronic zoom is used in zoom-in to a cutout image although the present modification uses optical zoom and electronic zoom in combination with each other in zoom-in to a cutout image.

Up to processing of determining a zoomed area A2, operation of the present embodiment is the same as that of the second embodiment. When a user operates the operation unit 23a so as to zoom in, zoom-in is performed as shown in FIG. 13A, FIG. 13B, FIG. 13C, FIG. 13D, and FIG. 13E. That is, optical zoom is used until edges of an image area A3 correspond to edges of the zoomed area A2 (FIG. 13A and FIG. 13B, and FIG. 13B and FIG. 13C) from a whole image shown in FIG. 13A. Thereafter, electronic zoom is used until the zoomed area A2 is reached (from FIG. 13C to FIG. 13D and FIG. 13D to FIG. 13E). The other features of operation are the same as those of the second embodiment.

Figure 13A:
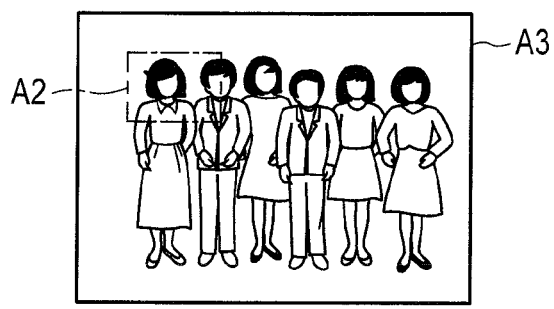
FIG. 13A, FIG. 13B, FIG. 13C, FIG. 13D, and FIG. 13E each show an example of an image area during zoom operation of a digital camera according to a first modification of the second embodiment.
Figure 13B:
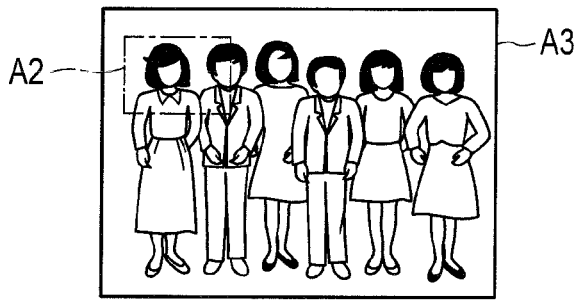
Figure 13C:
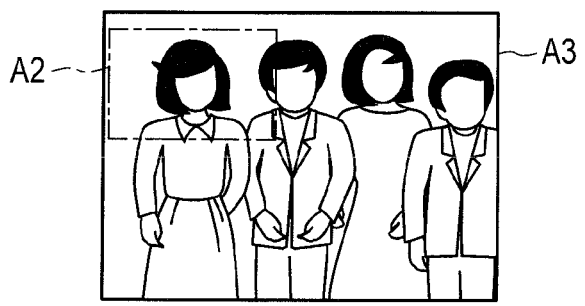
Figure 13D:
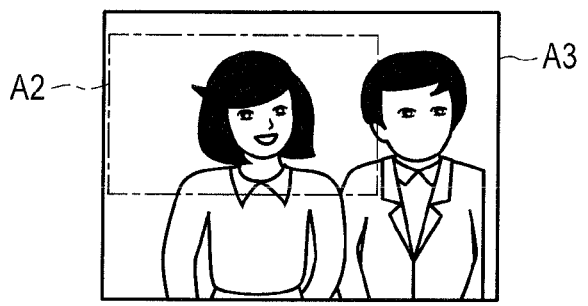
Figure 13E:
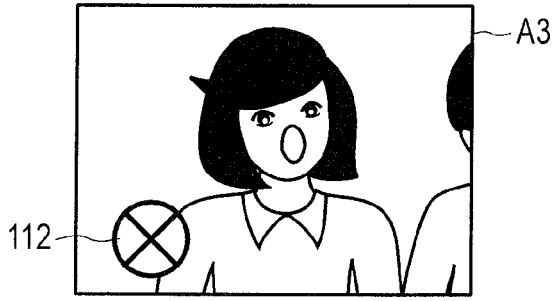

According to the present embodiment, not only electronic zoom but also optical zoom is used. Therefore, deterioration of image quality can be suppressed in comparison with use of only the electronic zoom. However, in recording a whole image, an image is obtained as shown in FIG. 13C which is different from the whole image of FIG. 13A. This is because a sensible range of the optical system is limited if optical zoom is used together.

Figure 14:
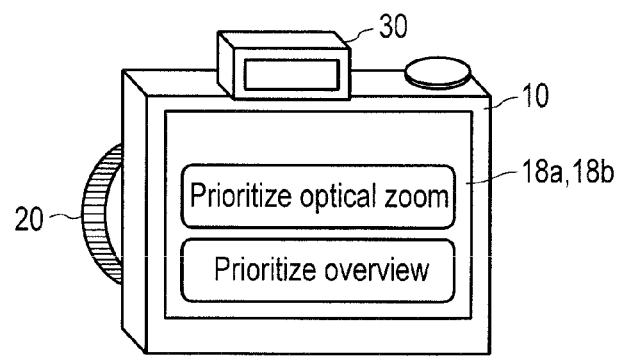
FIG. 14 is a view for explaining an example of options displayed on a display section of the digital camera according to the first modification of the second embodiment.

As in the present modification, the configuration may be arranged to allow a user to select either operation using optical zoom and electronic zoom in combination or operation using only electronic zoom as in the second embodiment. In this case, a choice of prioritizing optical zoom to prioritize image quality as in the present modification and a choice of prioritizing an overview of the whole image as in the second embodiment are configured to be displayed on the display unit 18a as shown in FIG. 14. The digital camera 1 may be configured to operate according to a user's choice. When the choice of prioritizing optical zoom is selected, optical zoom is performed within a range which can be covered under control of the optical zoom. Otherwise, electronic zoom is performed. In this case, a main image is restricted by the optical system. Accordingly, the person standing at the right end of FIG. 13A is not imaged, and thus, the overview is not prioritized. On the other side, when a sub image is cut out only by electronic zoom, the main image is not limited by the optical system. Accordingly, the main image shows the overview and the sub image shows a trimmed image. This feature has been particularly described in the second embodiment. However, since the first embodiment does not use any main image, there has been no special description thereof in the first embodiment. However, the concept of using optical zoom together in combination is applicable also to the first embodiment.

Second Modification of Second Embodiment

Figure 15A:
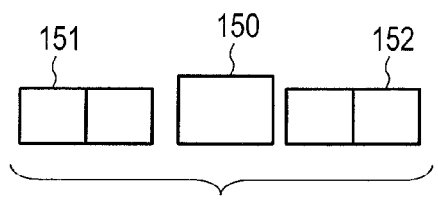
FIG. 15A is a view for explaining a retrospective photo mode as an example of an imaging mode of a digital camera according to a second modification of the second embodiment.
Figure 15B:
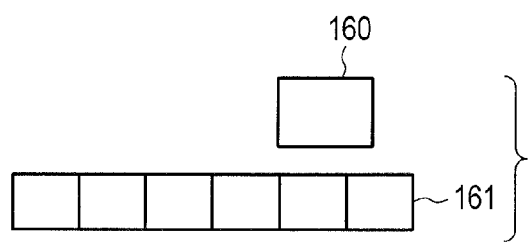
FIG. 15B is a view for explaining a photo-in-movie mode as an example of the digital camera according to the second modification of the second embodiment.
Figure 15C:
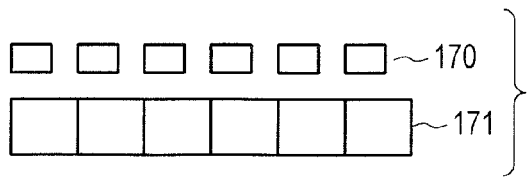
FIG. 15C is a view for explaining a multi-frame mode as an example of an imaging mode of the digital camera according to the second modification of the second embodiment.

The second modification of the second embodiment will now be described. Difference from the first embodiment will be described. The same portions as those of the first embodiment will be denoted at the same reference signs, and detailed descriptions thereof will be omitted. The digital camera 1 according to the present modification can perform recording in three modes, outlines of which are schematically shown in FIG. 15A, FIG. 15B, and FIG. 15C. That is, the first mode is referred to as a retrospective photo mode which records a still image 150, a motion picture 151 for a predetermined period prior to imaging of the still image, and a motion picture 153 for a predetermined period subsequent to the imaging of the still image, as shown in FIG. 15A. The second mode is referred to as a photo-in-movie mode in which a desired still image 160 is recorded in accordance with recording of the motion picture 161, as shown in FIG. 15B. The third mode is referred to as a multi-frame mode in which two type of motion pictures are recorded, i.e., a whole image 171 and a cutout image 170 are recorded, as shown in FIG. 15B.

Figure 16:
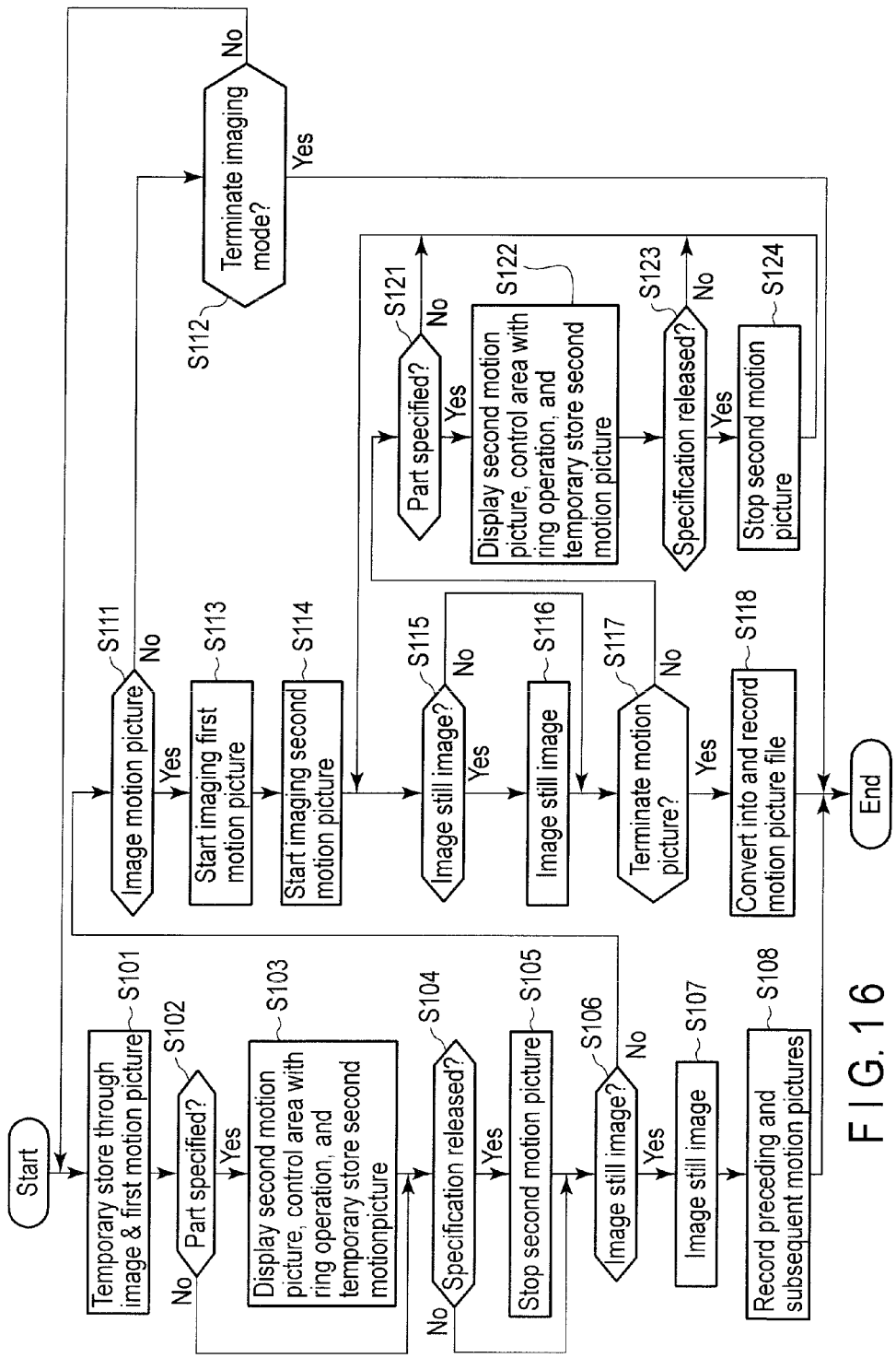
FIG. 16 is a flowchart which shows an example of processing in the digital camera according to the second modification of the second embodiment.

FIG. 16 shows a flowchart concerning a processing according to the present modification. In Step S101, the signal processing controller 11 displays a through image on a display unit 18a or an eyepiece display unit 31, and makes a second storage unit 14b store this image as a first motion picture. In Step S102, the signal processing controller 11 determines whether the part to be cut out is specified or not. When the part is determined to have not been specified, the processing goes to Step S104. When the part is determined to have been specified, the signal processing controller 11 makes the cutout part be displayed as a second motion picture on the display unit 18a or the eyepiece display unit 31 in Step S103. Both the first and second motion pictures may be displayed together or only the second motion picture may be displayed. At this time, the signal processing controller 11 controls an area to be cut out as in the second embodiment, in accordance with operation of the operation unit 23a, for example, which is a zoom ring of the lens 20 by the user. The signal processing controller 11 makes the second storage unit 14b store a second motion picture.

The signal processing controller 11 determines whether the part specified has been released or not by touching the specification release key 112 shown in FIG. 11D in Step S104. When the part specified is determined to have not been released, the processing goes to Step S106. When the part specified is determined to have been released, the signal processing controller 11 displays the first motion picture which is a whole image on the display unit 18a or the eyepiece display unit 31, and stops storing the second motion picture into the second storage unit 14b in Step S105.

The signal processing controller 11 determines whether an instruction to image a still image has been inputted, for example, by pressing a release button of the operation unit 16 or not in Step S106. When an instruction to image a still image is determined to have been inputted, the signal processing controller 11 performs imaging of a still image in Step S107, and makes the recording unit 17 record the still image of a whole image and/or a cutout image. The signal processing controller 11 reads the first motion picture as a whole image and/or the motion picture as a cutout image, imaged during the predetermined period prior to imaging of the still image in Step S108, from the second storage unit 14b, and records the first and/or second motion pictures onto the recording unit 17. The signal processing controller 11 records the first motion picture as a whole image and/or the motion picture as a cutout image imaged during the predetermined period subsequent to imaging of the still image, onto the recording unit 17. Thereafter, the processing is terminated. That is, data of the retrospective photo mode is recorded on the recording unit 17.

When any instruction to image a still image is determined to have not been inputted in Step S106, the signal processing controller 11 determines whether an instruction to image a motion picture has been inputted, for example, by pressing a motion-picture capture button of the operation unit 16 or not in Step S111. Otherwise, when any instruction to image a motion picture has not been inputted, the processing goes to Step S112. The signal processing controller 11 determines whether the imaging mode has been terminated or not, in Step S112. When the imaging mode is determined to have not been terminated, the processing returns to Step S101. When the imaging mode is determined to have been terminated, the processing ends.

When an instruction to image a motion picture is determined to have been inputted in Step S111, the signal processing controller 11 starts imaging the first motion picture which is a whole image in Step S113. Thereafter, the first motion picture is continuously recorded onto the recording unit 17 until motion-picture imaging is terminated. The signal processing controller 11 starts imaging of a second motion picture in Step S114, when the second motion picture which is a cutout image is obtained.

The signal processing controller 11 determines whether an instruction to image a still image has been inputted or not in Step S115. When any instruction to image a still image is determined to have not been inputted, the processing goes to Step S117. When an instruction to image a still image is determined to have been inputted, the signal processing controller 11 performs imaging of a still image in Step S116, and makes the recording unit 17 record a still image of a whole image and/or a cutout image. That is, together with motion picture data to be recorded later, data in the photo-in-movie mode is recorded onto the recording unit 17.

The signal processing controller 11 determines whether an instruction to terminate imaging of a motion picture has been inputted or not in Step S117. When an instruction to terminate imaging of a motion picture is determined to have been inputted, the signal processing controller 11 converts the first motion picture and/or the second motion picture into a file, and makes the recording unit 17 record the file in step S118. At this time, when a still image imaged in Step S115 exists, the signal processing controller 11 links the motion picture file with the still images, and forms a file of the photo-in-movie mode.

When an instruction to terminate imaging of a motion picture is determined to have not been inputted in Step S117, the signal processing controller 11 determines whether a part to be cut out has been specified or not in step S121. When the part is determined to have not been specified, the processing returns to Step S115. When the part is determined to have been specified, the signal processing controller 11 makes the cutout part be displayed as a second motion picture on the display unit 18a or the eyepiece display unit 31 in Step S122. The first motion picture may be displayed together with the second motion picture or only the second motion picture may be displayed. At this time, the signal processing controller 11 controls an area to cut out in accordance with operation of the operation unit 23a, for example, as a zoom ring of the lens 20 by the user. The signal processing controller 11 makes the second storage unit 14b store also the second motion picture. Thus, the first and second motion pictures are recorded simultaneously by multi-recording.

The signal processing controller 11 determines whether the part specified part has been released or not in Step S123. If the part specified has not been released, the processing returns to Step S115. If the part specified has been released, the signal processing controller 11 displays the first motion picture as a whole image on the display unit 18a or the eyepiece display unit 31, and stops recording the second motion picture onto the second storage unit 14b in Step S124. Thereafter, the processing returns to Step S115.

According to the present modification, motion pictures and still images can be recorded in the retrospective photo mode, photo-in-movie mode, or multi-frame mode. At this time, a cutout area in a cutout image is controlled by operation using the operation unit 23a, so as to zoom in an area specified by the touch panel 18b as in the second embodiment. These modes are to switch a main image obtained by almost all part of the imaging element and a cutout sub image, depending on how the user obtains and uses the images.

Third Embodiment

The third embodiment of the invention will now be described. Difference from the first embodiment will be described below. The same portions as those of the first embodiment will be denoted at the same reference signs, and detailed descriptions thereof will be omitted. A lens 20 according to the present embodiment is a zoom lens in which positions of lenses are moved and controlled by motors. A focal distance of the lens 20 is controlled to change according to operation of the operation unit 23a which is a switch. Such zoom control will be referred to as electric zoom control. FIG. 17 shows an example configuration of a lens optical system 26 according to the present embodiment. As shown in this figure, the lens optical system 26 according to the present embodiment comprises five groups of lenses. From an objective lens as the lens G1 of the first group toward an imaging unit 12, a lens G2 of the second group, a lens G3 of the third group, a lens G4 of the fourth group, and a lens G5 of the fifth group are arranged in this order.

The lens G1 of the first group and the lens G5 of the fifth group are fixed. The lens G2 of the second group is driven by a first motor 261 and lead screw 261s. The lens G2 of the second group functions as a lens group for focusing. The lens G3 of the third group is driven by a second motor 262 and lead screws 262s, and the lens G4 of the fourth group is driven by the third motor 263 and lead screws 263s. The lens G3 of the 3rd group and the lens G4 of the fourth group function as lens groups for changing a focal distance. Accordingly, the first motor 261 functions as a drive unit 24b, and the second motor 262 and the third motor 263 function as a drive unit 24a. The first motor 261, second motor 262, and third motor 263 are, for example, stepping motors.

The lens G3 of the third group is provided with a linear encoder 265, and the position of the lens G3 of the third group is obtained by using the linear encoder 265. The lens 4 of the fourth group is provided with a douser 267 and a photo-interrupter 268. The position of the lens G4 of the fourth group is obtained by using the douser 267 and the photo-interrupter 268. Accordingly, the linear encoder 265, douser 267, and photo-interrupter 268 function as a position detector 25a. The lens 26 configured in this manner is not limited to the present embodiment but can be used in the first and second embodiments.

Figure 18A:
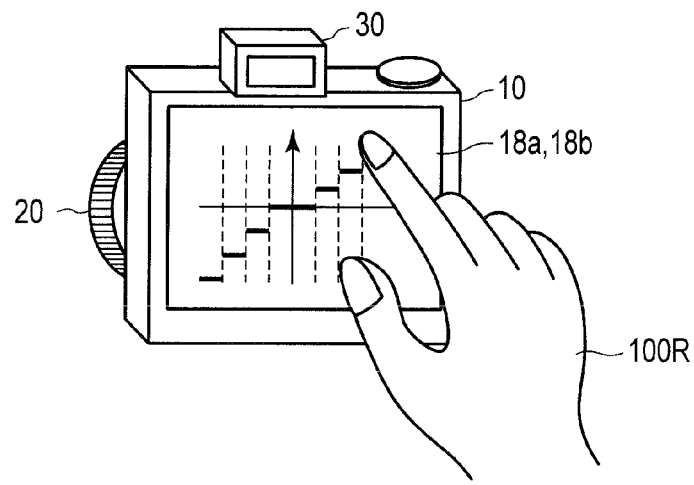
FIG. 18A, FIG. 18B, and FIG. 18C each are a view for explaining an example of changing a relationship between a switch operation amount and a zoom variation speed in the digital camera according to the third embodiment.
Figure 18B:
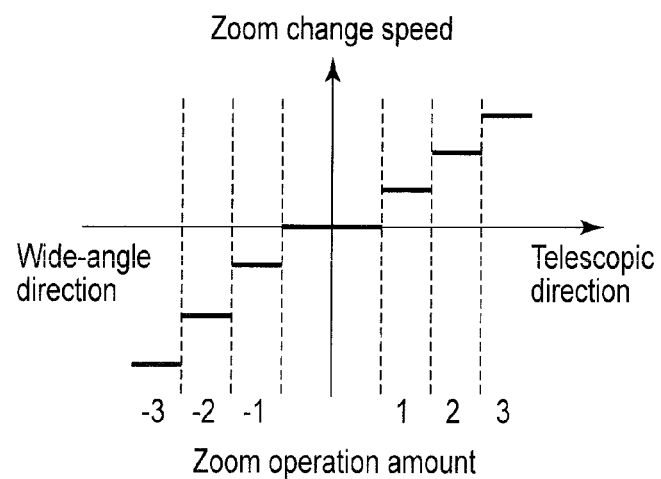
Figure 18C:
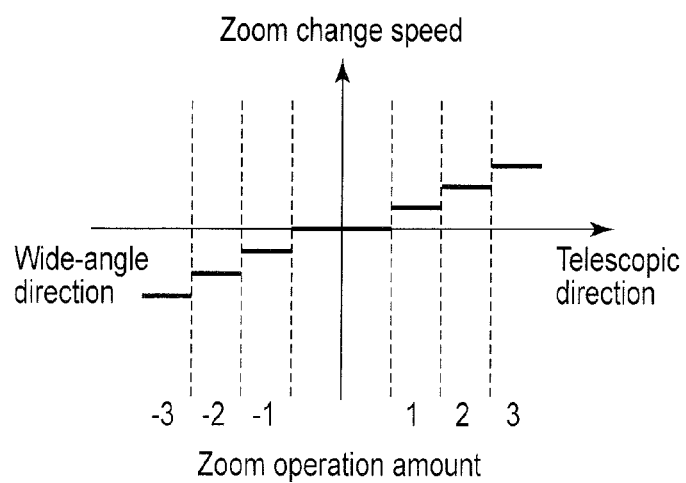

The operation unit 23a according to the present embodiment is, for example, a zoom ring and is provided with three-step switches to a telescopic side and a wide-angle side. The zoom change speed and one-shot zoom-in function to a set angle described later are assigned respectively to the switches, respectively. In the present embodiment, assignment of these switches may be set by the user. That is, as shown in FIG. 18A, a relationship between a switch operation amount and a zoom change speed can be changed, for example, from FIG. 18B to FIG. 18C, i.e., so as to lower the change speed as the user touches the touch panel 18b and slides a finger on a graph. Thus, the digital camera 1 is configured in a manner that the zoom change speed can be changed up and down as the user operates the touch panel 18b.

Figure 19A:
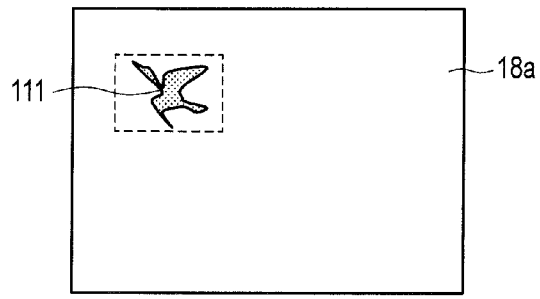
FIG. 19A and FIG. 19B each are a view for explaining an example of a scene where the digital camera according to the second embodiment is used.
Figure 19B:
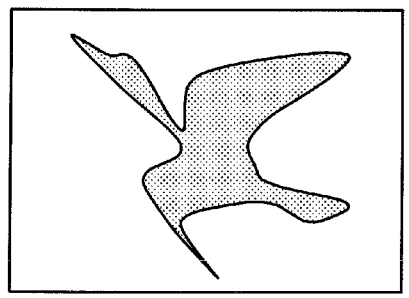
Figure 20:
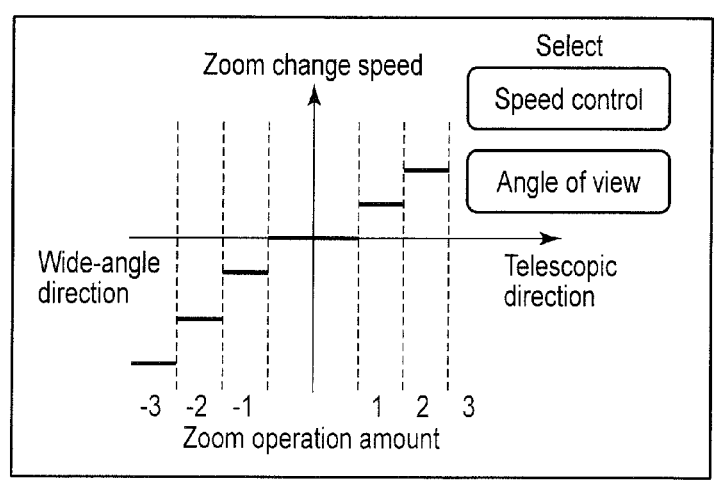
FIG. 20 is a view showing an example of a setting image of the digital camera according to the third embodiment.

The digital camera 1 may be set as follows. For example, in an image as shown in FIG. 19A, for example, an interested object 111 such as a bird, which is an area inside a broken line, is set by touching the touch panel 18b. When one-shot zoom-in to a set angle of view is assigned to the switch in the third step in the telescopic side, the angle of view is changed at once to FIG. 19B from FIG. 19A by using electronic zoom. A selection image as shown in, for example, FIG. 20 is displayed on the display unit 18a to allow the user to perform setting as described above. For example, when "speed control" is selected, adjustment as shown in FIG. 18A is available. When "angle of view setting" is selected, for example, a function of one-shot zoom-in such as transition to FIG. 19B from FIG. 19A is assigned to the switch in the third step in the telescopic side. Thus, when the user turns on the switch in the third step on the telescopic side at the instance when the bird flies up, the digital camera 1 performs one-shot zoom-in to a specified area by electronic zoom, and obtains a zoomed image at the instance. When enlarged by electronic zoom, the function of one-shot zoom-out by electronic zoom may be assigned to, for example, the third step in the wide-angle side.

In the first embodiment, the operation unit 23a is configured so as to maintain a predetermined relationship between the rotation angle of the ring part, for example, as the operation units 23a of the zoom lens and the focal distance of the lens. However, the predetermined relationship is not limited hitherto but the embodiment particularly discloses that the predetermined relationship can be modified. The operation member need not be a ring rotation member but may be a switch for switching between telescope and wide-angle. At this time, the rotation amount of the ring rotation member can be associated with a press amount of the switch. The user can set zoom change per time and change of a cutout range.

FIG. 21 shows a flowchart of an example of processing according to the present embodiment. The signal processing controller 11 detects operation of the operation unit 23a in Step S201. The signal processing controller 11 detects whether the operation unit 23a is operated toward the telescopic side (telescopic direction) or not in Step S202. If the operation unit 23a is determined to be operated toward the telescopic side, the signal processing controller 11 determines whether a change has been made to settings or not in Step S211. If any change is determined to have been made to settings, the signal processing controller 11 makes the lens optical system 26 zoom toward the telescopic side in accordance with initial settings in Step S212. Thereafter, the processing is terminated. If any change is determined to have been made to settings, the signal processing controller 11 makes the lens optical system 26 zoom toward the telescopic side in accordance with settings set by the users in Step S213. Thereafter, the processing is terminated.

If the operation unit 23a is determined to have not been operated toward the telescopic side in Step S202, the signal processing controller 11 determines whether the operation unit 23a is operated toward the wide-angle side (wide-angle direction) in Step S203. If the operation unit 23a is determined to be operated toward the wide-angle side, the signal processing controller 11 determines whether a change has been made to settings or not in Step S221. If any change is determined to have not been made to settings, the signal processing controller 11 makes the lens optical system 26 zoom toward the wide side in accordance with the initial settings in Step S222. Thereafter, the processing is terminated. If any change is determined to have been made to settings, the signal processing controller 11 makes the lens optical system 26 zoom toward the wide side in accordance with settings set by the user in Step S223. Thereafter, the processing is terminated. If the lens optical system 23a is determined to have not been operated toward the wide-angle side in Step S203, the signal processing controller 11 makes the lens optical system 26 to stop zoom operation in Step S204.

According to the present embodiment, settings of operation of the lens 20 are changed by operation of the touch panel 18b of the camera body 10. For example, the zoom speed relative to operation of the operation unit 23a can be changed. As for the zoom speed, the speeds of both the optical zoom and the electronic zoom can be changed. As in the present embodiment, the touch panel 18b which is used to specify an interested object may also be used to change the settings of the lens 20.

Electronic zoom in which, once an interested object is specified, angle of view is changed at once to an interested position including the interested object at a stretch, is assigned to operation of the operation unit 23a. By such one-shot zoom-in as described, a zoom-in image can be obtained without missing good timing to take a picture.

Timing of installing programs executed by flowcharts described in each of the foregoing embodiments is not limited to a manufacturing period of an apparatus. The programs may be installed afterwards into an apparatus by using a medium such as the Internet or a memory card. Therefore, the present invention covers programs assuming electronic apparatuses as described in the embodiments. The invention further covers even downloading by a user and an apparatus configured to be able to use such control programs through a network.

The foregoing embodiments of the invention include inventions as follows.

[1] An imaging apparatus comprising:
a zoom operation member configured to determine zoom change per time and a stop position; and
a specification unit configured to specify a zoom center in an image.

[2] The imaging apparatus described in [1], wherein the zoom operation member includes a switch for switching between telescopic side and wide side.

[3] The imaging apparatus described in [1], wherein the zoom operation member includes a ring-shape rotary member.

[4] The imaging apparatus described in [1], wherein the zoom includes optical zoom and electronic zoom.

[5] The imaging apparatus described in [1], further comprising an input unit configured to be inputted a change rate of the zoom change per time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit configured to capture an image of an object;
a display unit configured to display the image of the object, the object being subjected to zooming;
a zoom operation obtaining unit configured to obtain a user input amount of a zoom operation; and
an input unit configured to receive, via additional user input, a zoom change speed which is a relationship between the user input amount of the zoom operation and an amount of the zooming, the relationship being displayed in the display unit,
wherein when the zoom operation obtaining unit obtains the zoom operation, an angle of view of capture is changed immediately to an area of the object by using electronic zoom on a condition that one-shot zoom-in is assigned to the zoom operation obtaining unit and the area of the object is set.

2. The imaging apparatus of claim 1, further comprising:
a zoom lens, the imaging unit capturing the image of the object through the zoom lens; and
a controller configured to control an operation of an optical zoom by using the zoom lens in response to the amount of the zoom operation in accordance with the zoom change speed.

3. The imaging apparatus of claim 1, further comprising:
a controller configured to control an operation of an electronic zoom in response to the amount of the zoom operation in accordance with the zoom change speed.

4. The imaging apparatus of claim 1, wherein the zoom operation obtaining unit includes a wide zoom operation member to obtain an amount of a zoom out operation and a tele zoom operation member to obtain an amount of a zoom in operation.

5. The imaging apparatus of claim 4, wherein
the wide zoom operation member includes a plurality of wide-zooming switches;
the tele zoom operation member includes a plurality of tele-zooming switches;
the zoom change speed has a plurality of speed values;
each of the wide-zooming switches is assigned one of the speed values; and
each of the tele-zooming switches is assigned one of the speed values.

6. The imaging apparatus of claim 1, wherein the zoom operation obtaining unit includes a switch which is assigned the one-shot zoom-in function.

7. The imaging apparatus of claim 1, wherein the zoom operation obtaining unit is provided with a lens, the imaging unit capturing the image of the object through the lens.

8. The imaging apparatus of claim 1, wherein the input unit includes a touch panel which is provided on the display unit.

9. A method of imaging comprising:
capturing an image of an object;
displaying the image of the object in a display unit, the object being subjected to zooming;
obtaining a user input amount of a zoom operation; and
obtaining, via additional user input, a zoom change speed which is a relationship between the amount of the user input zoom operation and an amount of the zooming, the relationship being displayed in the display unit,
wherein when obtaining the user input amount of zoom operation, an angle of view of capture is changed immediately to an area of the object by using electronic zoom on a condition that one-shot zoom-in is assigned to the zoom operation and an area of the object is set.

* * * * *